United States Patent
Shimizu et al.

(10) Patent No.: US 11,527,116 B2
(45) Date of Patent: Dec. 13, 2022

(54) IN-VEHICLE RECORDING APPARATUS

(71) Applicant: Toyota Jidosha Kabushiki Kaisha, Toyota (JP)

(72) Inventors: Oki Shimizu, Toyota (JP); Yohsuke Yamaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 16/840,961

(22) Filed: Apr. 6, 2020

(65) Prior Publication Data

US 2020/0327746 A1 Oct. 15, 2020

(30) Foreign Application Priority Data

Apr. 11, 2019 (JP) .............................. JP2019-075451

(51) Int. Cl.
*G07C 5/08* (2006.01)
*G06F 1/3296* (2019.01)
*G06F 16/23* (2019.01)
*G07C 5/02* (2006.01)

(52) U.S. Cl.
CPC ........... *G07C 5/085* (2013.01); *G06F 1/3296* (2013.01); *G06F 16/2379* (2019.01); *G07C 5/02* (2013.01)

(58) Field of Classification Search
None
See application file for complete search history.

(56) References Cited

U.S. PATENT DOCUMENTS

| | | | |
|---|---|---|---|
| 10,262,477 B1 * | 4/2019 | Nguyen | G07C 5/008 |
| 10,909,782 B1 * | 2/2021 | Natanzon | G07C 5/0841 |
| 2009/0306848 A1 | 12/2009 | Kohsaka et al. | |
| 2013/0117857 A1 | 5/2013 | Zimmermann | |
| 2016/0063776 A1 | 3/2016 | Chronowski et al. | |
| 2016/0325681 A1 | 11/2016 | Van Dan Elzen | |
| 2017/0132918 A1 | 5/2017 | Uno | |
| 2017/0148237 A1 | 5/2017 | Iwaasa | |
| 2020/0043254 A1 | 2/2020 | Hase et al. | |
| 2021/0180987 A1 * | 6/2021 | Terada | G08G 1/20 |

FOREIGN PATENT DOCUMENTS

| | | |
|---|---|---|
| CN | 109118608 A | 1/2019 |
| DE | 19720348 A1 | 11/1998 |
| DE | 102010030794 A1 | 1/2012 |
| DE | 102015113436 A1 | 3/2016 |
| JP | H11212784 A | 8/1999 |

(Continued)

*Primary Examiner* — Wynuel S Aquino
(74) *Attorney, Agent, or Firm* — Dinsmore & Shohl LLP

(57) ABSTRACT

Provided is an in-vehicle recording apparatus including an information acquisition apparatus configured to acquire vehicle situation data, a storage apparatus, and a recording processing execution apparatus configured to execute, when an event defined in advance for the vehicle has occurred, recording processing of recording the vehicle situation data, which is defined in advance in accordance with a type of the event that has occurred, in the storage apparatus, the recording processing execution apparatus being further configured to, when a deletion condition including a deletion trigger condition is satisfied, delete vehicle situation data corresponding to the satisfied deletion trigger condition from the storage apparatus.

4 Claims, 11 Drawing Sheets

(56) References Cited

FOREIGN PATENT DOCUMENTS

| | | |
|---|---|---|
| JP | 2006-315491 A | 11/2006 |
| JP | 4929777 B2 | 5/2012 |
| JP | 2013-184494 A | 9/2013 |
| JP | 2014-133435 A | 7/2014 |
| JP | 2014-148293 A | 8/2014 |
| JP | 2016-088309 A | 5/2016 |
| JP | 2016-115264 A | 6/2016 |
| JP | 2016-218779 A | 12/2016 |
| JP | 2017-097556 A | 6/2017 |
| JP | 2018-180843 A | 11/2018 |

\* cited by examiner

FIG.5

EVENT TABLE

| EVENT ID (501) | EVENT DETAIL (502) |
|---|---|
| 1 | END OF ACC |
| 2 | START OF PCS |
| ⋮ | ⋮ |

EVENT-DATA RELATIONSHIP TABLE

| VEHICLE SITUATION DATA (601) | EVENT ID (602) |
|---|---|
| ACCELERATOR PEDAL OPERATION AMOUNT AP | 2, ··· |
| BRAKE PEDAL OPERATION AMOUNT BP | 2, ··· |
| ACTUAL STEERING ANGLE $\theta$ | ··· |
| ACTUAL STEERING TORQUE Tra | ··· |
| VEHICLE SPEED SPD | 1, 2, ··· |
| ACCELERATION Gs | 1, 2, ··· |
| SHIFT POSITION SFT | 2, ··· |
| POSITION INFORMATION (GPS RECEIVER) | 1, ··· |
| FIRST REFLECTED POINT INFORMATION (RADAR SENSOR) | 2, ··· |
| SECOND REFLECTED POINT INFORMATION (ULTRASONIC SENSOR) | 2, ··· |
| IMAGE DATA (CAMERA SENSOR) | 2, ··· |

| EVENT ID | RECORDING START TIME POINT | RECORDING END TIME POINT |
|---|---|---|
| 1 | t1 SECONDS BEFORE END TIME POINT OF ACC | t2 SECONDS AFTER END TIME POINT OF ACC |
| 2 | t3 SECONDS BEFORE START TIME POINT OF PCS | t4 SECONDS AFTER END TIME POINT OF PCS |
| ⋮ | ⋮ | ⋮ |

DATA RECORDING PERIOD TABLE

FIG.8

| EVENT ID | DATA HOLDING PERIOD (PERIOD IN WHICH DATA IS HELD SINCE TIMESTAMP) |
|---|---|
| 1 | Ta1 |
| 2 | Ta2 |
| ⋮ | ⋮ |

DATA HOLDING PERIOD TABLE

FIG.9

| EVENT ID | TIMESTAMP | SPD |
|---|---|---|
| 1 | XXXXXXXXXXXX | 60 |
| 1 | YYYYYYYYYYYY | 60 |
| ⋮ | ⋮ | ⋮ |
| 2 | HHHHHHHHHHHH | 20 |
| 2 | TTTTTTTTTTTT | 20 |
| ⋮ | ⋮ | ⋮ |

VEHICLE SPEED (SPD) RECORDING TABLE

FIG.10

EVENT OCCURRENCE TIME TABLE

| EVENT ID (1001) | EVENT OCCURRENCE TIME POINT (1002) |
|---|---|
| 1 | ZZZZZZZZZZZ |
| ⋮ | ⋮ |

DELETION TRIGGER CONDITION TABLE

| EVENT ID (1101) | DELETION TRIGGER CONDITION (1102) |
|---|---|
| 1 | PERIOD THAT HAS ELAPSED SINCE EVENT OCCURRENCE TIME POINT > $Tb1$ (WHERE $Tb1 > Ta1$) |
| 2 | PERIOD THAT HAS ELAPSED SINCE EVENT OCCURRENCE TIME POINT > $Tb2$ (WHERE $Tb2 > Ta2$) |
| ⋮ | ⋮ |

(1100)

IN-VEHICLE RECORDING APPARATUS

CROSS-REFERENCES TO RELATED APPLICATION

The present application claims priority to Japanese patent application No. JP 2019-075451 filed on Apr. 11, 2019, the content of which is hereby incorporated by reference in its entirety.

BACKGROUND

1. Technical Field

The present disclosure relates to an in-vehicle recording apparatus.

2. Description of the Related Art

Hitherto, there has been proposed an in-vehicle recording apparatus configured to record, when a predetermined event (e.g., execution of specific control) has occurred during traveling of a vehicle, information on a travel state of the vehicle and information on a situation of a periphery of the vehicle (for example, see Japanese Patent Application Laid-open No. 2016-115264 and Japanese Patent Application Laid-open No. 2017-097556).

For example, the apparatus (hereinafter referred to as "related-art apparatus") described in Japanese Patent Application Laid-open No. 2016-115264 is configured to record image data, which is obtained by photographing a peripheral region of the vehicle, in a storage apparatus (ROM) when automatic brake control is executed (that is, when an event has occurred).

In the related-art apparatus, the image data is not deleted from the storage apparatus, resulting in a problem in that old image data continues to remain in the storage apparatus. Such a problem may also occur in the apparatus described in Japanese Patent Application Laid-open No. 2017-097556.

SUMMARY

The present disclosure provides an in-vehicle recording apparatus capable of recording vehicle situation data including at least one of information on a travel state of a vehicle or information on a situation of a periphery of the vehicle, and deleting the vehicle situation data at an appropriate timing.

According to one or more embodiment, there is provided an in-vehicle recording apparatus including: an information acquisition apparatus configured to acquire vehicle situation data including at least one of vehicle travel data, which is information on a travel situation of a vehicle, or vehicle periphery data, which is information on a situation of a periphery of the vehicle; a storage apparatus, which enables writing, reading, and deletion of data; and a recording processing execution apparatus configured to execute, when an event defined in advance for the vehicle has occurred, recording processing of recording the vehicle situation data, which is defined in advance in accordance with a type of the event that has occurred, in the storage apparatus. The recording processing execution apparatus is further configured to, when a deletion condition including a deletion trigger condition is satisfied, executes deletion processing of deleting at least the vehicle situation data corresponding to the satisfied deletion trigger condition from the storage apparatus. The deletion trigger condition is defined in advance in accordance with the type of the event, and is satisfied when a timing to delete the vehicle situation data stored in the storage apparatus arrives.

According to the above configuration, the vehicle situation data is deleted from the storage apparatus at the appropriate timing defined in advance. Thus, it is possible to prevent a state in which unnecessary vehicle situation data (for example, old vehicle situation data) continues to remain in the storage apparatus.

In one or more embodiments, the recording processing execution apparatus is configured to employ, as the deletion trigger condition, a condition defined with a time point of occurrence of the event serving as a reference.

According to the above configuration, the recording processing execution apparatus can determine the timing to execute the deletion processing with the time point of occurrence of the event serving as the reference.

In one or more embodiments, the recording processing execution apparatus is configured to detect a connection state of a switch, which is configured to be changed from an OFF state to an ON state when a driver of the vehicle starts driving of the vehicle, and be changed from the ON state to the OFF state when the driver of the vehicle finishes the driving of the vehicle. Further, the recording processing execution apparatus is configured to execute the deletion processing by determining that the deletion condition is satisfied when, in addition to the deletion trigger condition, a first switch condition that the connection state of the switch is the OFF state is satisfied.

When the connection state of the switch is the OFF state, the vehicle is not being driven. In this situation, the recording processing execution apparatus is not executing the recording processing. According to the above configuration, the deletion processing is executed when the connection state of the switch is the OFF state. The deletion processing is executed in the period in which the recording processing is not being executed, and thus a processing load on the recording processing execution apparatus can be reduced.

In one or more embodiments, the recording processing execution apparatus is configured to detect a connection state of a switch, which is configured to be changed from an OFF state to an ON state when a driver of the vehicle starts driving of the vehicle, and be changed from the ON state to the OFF state when the driver of the vehicle finishes the driving of the vehicle. Further, the recording processing execution apparatus is configured to execute the deletion processing by determining that the deletion condition is satisfied when, in addition to the deletion trigger condition, a second switch condition and a predetermined deletion processing execution condition are satisfied. The second switch condition is satisfied when the connection state of the switch is the ON state, and the predetermined deletion processing execution condition is satisfied when a probability that the recording processing execution apparatus is executing the recording processing is low.

When the connection state of the switch is the ON state, the vehicle is being driven, and the recording processing execution apparatus may be executing the recording processing. Meanwhile, according to the above configuration, the recording processing execution apparatus can execute the deletion processing when the probability that the recording processing execution apparatus itself is executing the recording processing is low. Thus, the processing load on the recording processing execution apparatus can be reduced.

In one or more embodiments, the recording processing execution apparatus is configured to determine that the deletion processing execution condition is satisfied when both of a vehicle stopping condition and a vehicle periphery condition are satisfied. The vehicle stopping condition is satisfied when the vehicle is stopped, and the vehicle periphery condition is satisfied when a predetermined object does not exist in the periphery of the vehicle.

Under the situation in which the vehicle is stopped, and the predetermined object does not exist in the periphery of the vehicle, the possibility of the occurrence of the event is low, and thus the probability that the recording processing execution apparatus is executing the recording processing is low. According to the above configuration, the recording processing execution apparatus can execute the deletion processing in such a situation.

In one or more embodiments, the recording processing execution apparatus is configured to detect a connection state of a switch, which is configured to be changed from an OFF state to an ON state when a driver of the vehicle starts driving of the vehicle, and be changed from the ON state to the OFF state when the driver of the vehicle finishes the driving of the vehicle. The recording processing execution apparatus includes a first recording processing executor and a second recording processing executor, to each of which electric power is to be supplied from a power supply apparatus mounted on the vehicle regardless of whether the connection state of the switch is the ON state or the OFF state. The first recording processing executor is configured to: operate in a normal mode, which is a mode in which the recording processing and the deletion processing are allowed to be executed, when the connection state of the switch is the ON state; operate in a power saving mode, which is a mode in which a consumption amount of the electric power is smaller than a consumption amount of the electric power in the normal mode, and none of the recording processing and the deletion processing is allowed to be executed, when the connection state of the switch is the OFF state; and operate in the normal mode when the first recording processing executor receives an activation signal, which instructs to change the power saving mode to the normal mode, under a situation in which the first recording processing executor is operating in the power saving mode. The second recording processing executor is configured to: determine whether or not the deletion trigger condition is satisfied; transmit, when the second recording processing executor determines that the deletion trigger condition is satisfied, and the connection state of the switch is the OFF state, the activation signal to the first recording processing executor, and then transmit a deletion instruction signal, which instructs to execute the deletion processing, to the first recording processing executor; and transmit, when the second recording processing executor determines that the deletion trigger condition is satisfied, and the connection state of the switch is the ON state, the deletion instruction signal to the first recording processing executor without transmitting the activation signal to the first recording processing executor.

According to the above configuration, when the connection state of the switch is the OFF state, the first recording processing executor operates in the power saving mode. Thus, power consumption in the first recording processing executor can be reduced. Meanwhile, the first recording processing executor cannot execute the deletion processing in the power saving mode. However, when the connection state of the switch is the OFF state, the operation mode of the first recording processing executor is changed from the power saving mode to the normal mode by the activation signal transmitted by the second recording processing executor. As a result, the first recording processing executor can execute the deletion processing even under a situation in which the connection state of the switch is the OFF state.

In one or more embodiments, the first recording processing executor is configured to: determine whether or not the event has occurred, and transmit, when the first recording processing executor determines that the event has occurred, an event notification signal to the second recording processing executor, the event notification signal including information that enables identification of the type of the event that has occurred and an event occurrence time point indicating a time point at which the event has occurred. The second recording processing executor is configured to: record, when the second recording processing executor receives the event notification signal, the type of the event that has occurred and the event occurrence time point, which are included in the event notification signal, in association with each other; and determine that the deletion trigger condition is satisfied when a period that has elapsed since the event occurrence time point has become longer than a time threshold value defined in advance for each type of the event, to thereby transmit the deletion instruction signal to the first recording processing executor.

According to the above configuration, the second recording processing executor can cause the first recording processing executor to execute the deletion processing in accordance with the period that has elapsed since the event occurrence time point.

In one or more embodiments, the recording processing execution apparatus is configured to record, in the recording processing, the vehicle situation data in association with a time point at which the vehicle situation data has been acquired and the type of the event. The recording processing execution apparatus is configured to delete, in the deletion processing, a piece of vehicle situation data for which a period that has elapsed since the time point at which the vehicle situation data has been acquired exceeds a holding period defined in advance from the storage apparatus, among pieces of vehicle situation data associated with the event corresponding to the satisfied deletion trigger condition.

According to the above configuration, the recording processing execution apparatus can delete the vehicle situation data from the storage apparatus in accordance with the period that has elapsed since the time point at which the vehicle situation data has been acquired.

In one or more embodiments, the recording processing execution apparatus is further configured to delete, in the deletion processing, a piece of vehicle situation data for which a period that has elapsed since the time point at which the vehicle situation data has been acquired exceeds a holding period defined in advance from the storage apparatus, among pieces of vehicle situation data associated with an event other than the event corresponding to the satisfied deletion trigger condition.

According to the above configuration, the recording processing execution apparatus can also delete, in the deletion processing, the vehicle situation data associated with the event other than the event corresponding to the satisfied deletion trigger condition.

According to one or more embodiments, the above-mentioned recording processing execution apparatus is implemented by a microprocessor programmed for performing one or more operations and/or functionality described herein. In addition, the recording processing execution apparatus may be implemented, in whole or in part, by specifically configured to hardware (e.g., by one or more application specific integrated circuits or ASIC(s)). According to one or more embodiments, the above-mentioned storage apparatus includes a storage medium that enables writing, reading, and deletion of data, such as a memory, and the like.

In the above description, in order to facilitate understanding of at least one embodiment, a name and/or reference numeral used in at least one embodiment described below is enclosed in parentheses and assigned to each component corresponding to at least one embodiment. However, each component of at least one embodiment is not limited to at least one embodiment defined by the reference numeral.

BRIEF DESCRIPTION OF THE DRAWINGS

FIG. 5 is a table for illustrating an example of an event table.

FIG. 6 is a table for illustrating an example of an event-data relationship table.

FIG. 7 is a table for illustrating an example of a data recording period table.

FIG. 8 is a table for illustrating an example of a data holding period table.

FIG. 9 is a table for illustrating one of a plurality of tables (vehicle situation data recording tables) stored in a vehicle situation data storage, which records a vehicle speed.

FIG. 10 is a table for illustrating an example of an event occurrence time table.

FIG. 11 is a table for illustrating an example of a deletion trigger condition table.

DESCRIPTION OF THE EMBODIMENTS (Configuration)

Figure 1:
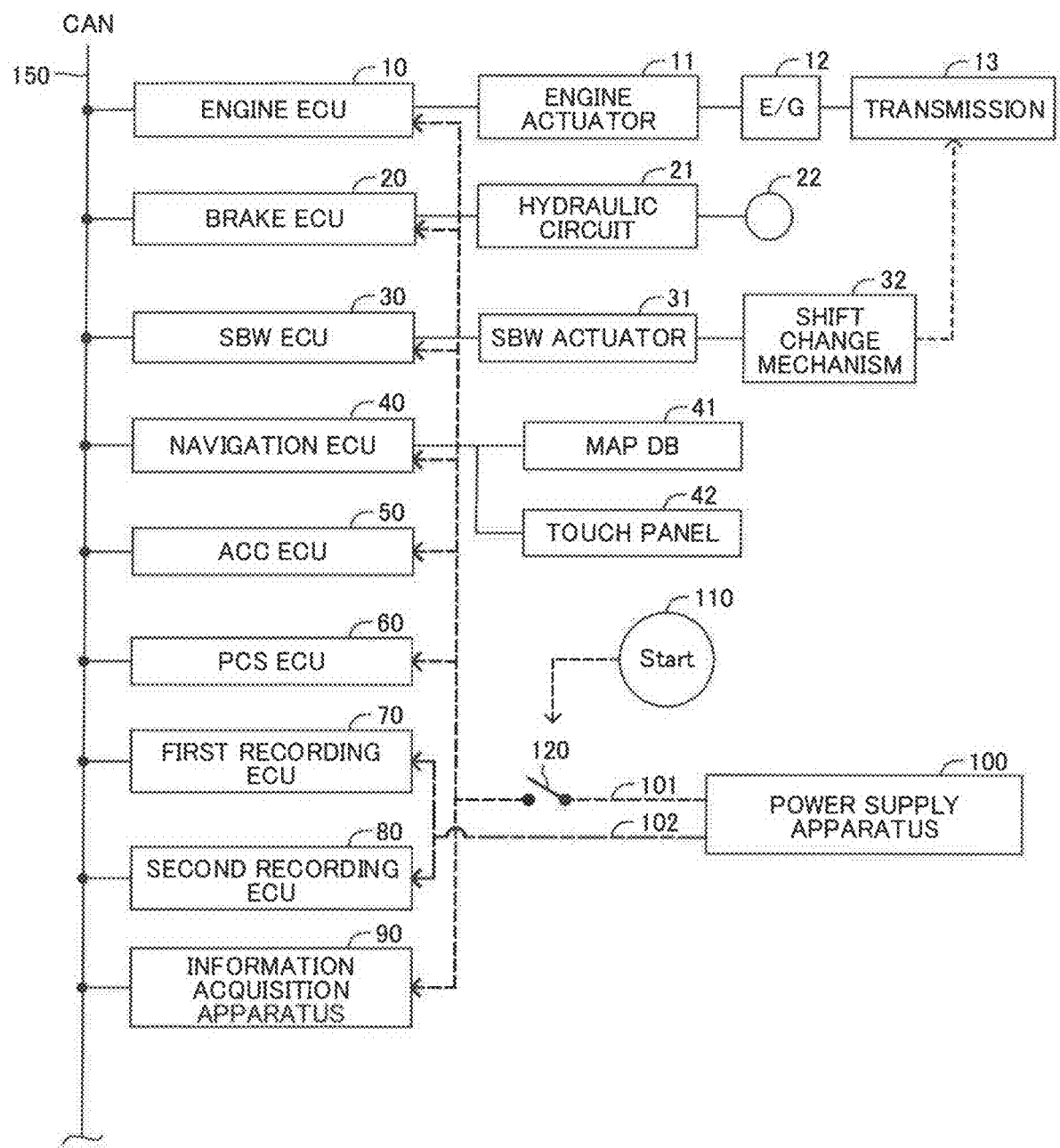
FIG. 1 is a schematic configuration diagram for illustrating an in-vehicle recording apparatus according to at least one embodiment of the present disclosure.

A recording apparatus according to at least one embodiment is applied to a vehicle. As illustrated in FIG. 1, the vehicle includes an engine ECU 10, a brake ECU 20, a shift-by-wire (SBW) ECU 30, a navigation ECU 40, an ACC ECU 50, a PCS ECU 60, a first recording ECU 70, and a second recording ECU 80. Those ECUs 10 to 80 are connected to one another so as to be able to mutually transmit and receive information through a CAN 150.

Each of the ECUs 10 to 80 is an electric control unit including at least one microcomputer. The microcomputer includes a CPU, a ROM, a RAM, a nonvolatile memory, and an interface (I/F). In the following, the term of "nonvolatile memory" means a storage apparatus (for example, an EEPROM and a hard disk drive) enabling writing, reading, and deletion of data. The CPU is configured to execute instructions (programs and routines) stored in the ROM, to thereby implement various functions.

Figure 2:
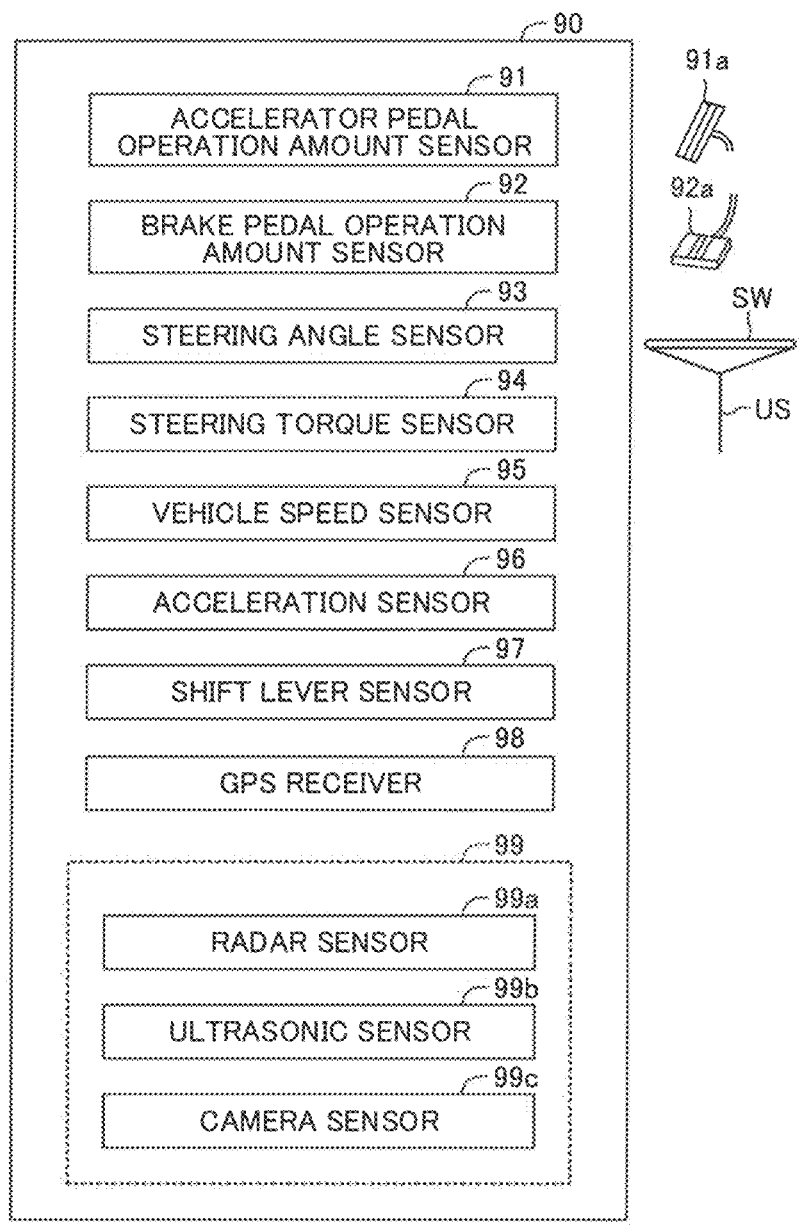
FIG. 2 is a diagram for illustrating a configuration of an information acquisition apparatus.

Further, the vehicle includes an information acquisition apparatus 90. As illustrated in FIG. 2, the information acquisition apparatus 90 includes components (sensors, switches, and the like) 91 to 99 described below.

An accelerator pedal operation amount sensor 91 is configured to detect an operation amount (accelerator opening degree) of an accelerator pedal 91a, and output a signal indicating an accelerator pedal operation amount AP.

A brake pedal operation amount sensor 92 is configured to detect an operation amount of a brake pedal 92a, and output a signal indicating a brake pedal operation amount BP.

A steering angle sensor 93 is configured to detect a steering angle of the vehicle, and output a signal indicating an actual steering angle θ.

The steering torque sensor 94 is configured to detect a steering torque applied to a steering shaft US of the vehicle by an operation of a steering wheel SW, and output a signal indicating an actual steering torque Tra.

A vehicle speed sensor 95 is configured to detect a travel speed (vehicle speed) of the vehicle, and outputs a signal indicating a vehicle speed SPD.

An acceleration sensor 96 is configured to detect an acceleration of the vehicle in a front-and-rear direction thereof, and output a signal indicating a detected acceleration Gs.

A shift lever sensor 97 is configured to detect a position of a shift lever, and output a signal indicating a detected position SFT of the shift lever.

A GPS receiver 98 is configured to receive GPS signals for detecting a position (latitude and longitude) of the vehicle, and output a signal indicating the position of the vehicle.

A periphery sensor 99 is configured to acquire information on a road (for example, a travel lane in which the vehicle is traveling) in a periphery of the vehicle, and information on a 3D object existing on the road, and output those pieces of information. The 3D object represents a moving object such as a vehicle, a pedestrian, and a two-wheeled vehicle, and a fixed object such as a guard rail and a fence. The periphery sensor 99 includes a radar sensor 99a, an ultrasonic sensor 99b, and a camera sensor 99c.

The radar sensor 99a is configured to radiate an electric wave in the millimeter wave band (hereinafter referred to as "millimeter wave") to a predetermined region in the periphery of the vehicle, and receive the millimeter wave reflected by a 3D object existing in the predetermined region. The radar sensor 99a uses a relationship between the transmitted millimeter wave and the received millimeter wave to acquire information (hereinafter referred to as "first reflected point information") indicating a "position of a reflected point, which is a point on a 3D object that has reflected the radiated millimeter wave", a "distance between the radar sensor 99a and the 3D object", and the like.

The ultrasonic sensor 99b is configured to radiate an ultrasonic wave having a pulse form to a predetermined range of the periphery of the vehicle, and receive the ultrasonic wave reflected by a 3D object existing in the predetermined range. The ultrasonic sensor 99b uses a relationship between the transmitted ultrasonic wave and the received ultrasonic wave to acquire information (hereinafter referred to as "second reflected point information") indicating a "distance between the ultrasonic sensor 99b and the 3D object" and the like.

The camera sensor 99c is a digital camera incorporating an image pickup element such as a charge coupled device (CCD) or a CMOS image sensor (CIS). The camera sensor 99c is configured to acquire image data on the peripheral region of the vehicle at a predetermined frame rate.

In the following, "information on a travel situation of the vehicle" acquired by the sensors 91 to 97 and the GPS receiver 98 is referred to as "vehicle travel data (or vehicle travel information)". Further, "information on a periphery situation of the vehicle" acquired by the periphery sensor 99 is referred to as "vehicle periphery data (or vehicle periphery information)". The "vehicle travel data" and the "vehicle periphery data" are collectively referred to as "vehicle situation data (vehicle situation information)".

The information acquisition apparatus 90 is configured to transmit, to the ECUs 10 to 80 through the CAN 150, the vehicle situation data together with a time point (including a date) at which the vehicle situation data was acquired (detected) each time a predetermined period of time (referred to as "first predetermined period of time" for the sake of convenience) elapses.

Referring back to FIG. 1, the vehicle includes a power supply apparatus 100. The power supply apparatus 100 includes a battery (not shown) and an alternator (not shown). The alternator is configured to generate electric power through use of the rotation of an engine 12. The power supply apparatus 100 is configured to supply the electric power to electric loads included in the vehicle. More specifically, the electric power of the power supply apparatus 100 is supplied to the electric loads included in the vehicle through two systems of power supply lines (a first power supply line 101 and a second power supply line 102).

The first power supply line 101 connects the power supply apparatus 100 to the ECUs 10, 20, 30, 40, 50, and 60 and the information acquisition apparatus 90 through an ignition switch 120. The ignition switch 120 is hereinafter referred to as "IG switch 120". A state of the IG switch 120 is changed in accordance with an operation of an engine start button 110. The engine start button 110 is hereinafter simply referred to as "start button 110". The start button 110 is a button to be operated when a driver instructs the vehicle to start or stop the engine 12. Each time the start button 110 is pressed, a state of the start button 110 is alternately switched between an ON state and an OFF state. The start button 110 can be regarded as a button to be switched from the OFF state to the ON state by the driver so that the vehicle is set ready for traveling.

When the engine 12 is stopped and the driver starts driving of the vehicle, the driver presses the start button 110 to change the state of the start button 110 from the OFF state to the ON state. When the state of the start button 110 has become the ON state, the state of the IG switch 120 is changed from an OFF state (disconnection state) to an ON state (connection state). When the IG switch 120 is in the ON state, the electric power of the power supply apparatus 100 is supplied to the ECUs 10, 20, 30, 40, 50, and 60, and the information acquisition apparatus 90 through the first power supply line 101.

When the driver finishes driving of the vehicle, the driver presses the start button 110 to change the state of the start button 110 from the ON state to the OFF state. When the state of the start button 110 has become the OFF state, the IG switch 120 is changed from the ON state to the OFF state. When the IG switch 120 is in the OFF state, the electric power of the power supply apparatus 100 is not supplied to the ECUs 10, 20, 30, 40, 50, and 60, and the information acquisition apparatus 90.

The second power supply line 102 directly connects the power supply apparatus 100 to "the first recording ECU 70 and the second recording ECU 80". That is, the power supply apparatus 100 and "the first recording ECU 70 and the second recording ECU 80" are connected to one another without intervention of the IG switch 120. Thus, regardless of the state of the IG switch 120 (that is, regardless of whether the IG switch 120 is in the ON state or the OFF state), the electric power of the power supply apparatus 100 is supplied to the first recording ECU 70 and the second recording ECU 80.

The engine ECU 10 drives an engine actuator 11 based on the accelerator pedal operation amount AP and other driving state amounts (for example, engine rotation speed), to thereby change a torque (engine-generated torque) generated by the engine 12. The engine-generated torque is transmitted to drive wheels through a transmission 13. Thus, the engine ECU 10 can control a driving force of the vehicle by controlling the engine actuator 11.

When the vehicle is a hybrid vehicle, the engine ECU 10 is capable of controlling a driving force generated by any one of or both of "an internal combustion engine and an electric motor" serving as vehicle driving sources. Further, when the vehicle is an electric vehicle, the engine ECU 10 is capable of controlling a driving force generated by an electric motor serving as a vehicle driving source.

The brake ECU 20 is configured to drive a hydraulic circuit 21, which functions as a brake actuator. The hydraulic circuit 21 is provided between a master cylinder (not shown), which is configured to pressurize hydraulic fluid through use of a stepping force on the brake pedal 92a, and friction brake mechanisms 22 provided for left and right wheels and front and rear wheels. The hydraulic circuit 21 is configured to adjust a hydraulic pressure supplied to a wheel cylinder (not shown) of each of the friction brake mechanisms 22 in accordance with an instruction from the brake ECU 20. The wheel cylinder generates a friction braking force to be applied to the wheel through use of the hydraulic pressure. Thus, the brake ECU 20 can control a braking force of the vehicle by controlling the hydraulic circuit 21.

The SBW ECU 30 is configured to receive the position of the shift lever from the shift lever sensor 97, and drives an SBW actuator 31 based on the shift lever position. The SBW actuator 31 controls a shift change mechanism 32 in accordance with an instruction from the SBW ECU 30, to thereby change a shift position of the transmission 13 to one of a plurality of shift positions. In this example, the shift positions include at least a parking position, a neutral position, a forward position, and a reverse position. In the parking position, the driving force is not transmitted to the driving wheels, and the vehicle is mechanically locked to a stop position. In the neutral position, the driving force is not transmitted to the driving wheels, and the vehicle is not mechanically locked to the stop position. In the forward position, the driving force for moving the vehicle forward is transmitted to the driving wheels. In the reverse position, the driving force for moving the vehicle backward is transmitted to the driving wheels.

The navigation ECU 40 is connected to a map database 41 and a touch panel 42. The map database 41 stores map information. The navigation ECU 40 is configured to receive the position (the latitude and the longitude) of the vehicle from the GPS receiver 98, and cause the touch panel 42 to display the position of the vehicle on the map.

The ACC ECU 50 is configured to execute adaptive cruise control (ACC) when the adaptive cruise control is requested by an ACC switch (not shown). The adaptive cruise control is hereinafter simply referred to as "ACC". The ACC is travel supporting control in which follow-up control is added to speed-maintaining control. The speed-maintaining control is control of causing the vehicle to travel at a predetermined target vehicle speed without requiring an operation of the accelerator pedal 91a and an operation of a brake pedal 92a. The follow-up control is control of causing the vehicle (own vehicle) to travel by following a preceding vehicle traveling immediately ahead of the own vehicle while maintaining an inter-vehicle distance between the preceding vehicle and the own vehicle to a predetermined distance without requiring the operation of the accelerator pedal 91a and the operation of the brake pedal 92a. The ACC itself is widely known (see Japanese Patent Application Laid-open No. 2014-148293, Japanese Patent Application Laid-open No. 2006-315491, and Japanese Patent No. 4929777, for example).

The PCS ECU 60 is configured to monitor whether or not there is a 3D object (obstacle) that is highly likely to collide with the vehicle, and execute pre-crash control for avoiding collision with the 3D object when there is such a 3D object. The pre-crash control is widely known, and is also referred to as pre-crash safety control. The pre-crash control includes issuing a warning to the driver and application of the braking force. The pre-crash control is hereinafter simply referred to as "PCS".

(Configuration of First Recording ECU)

Figure 3:
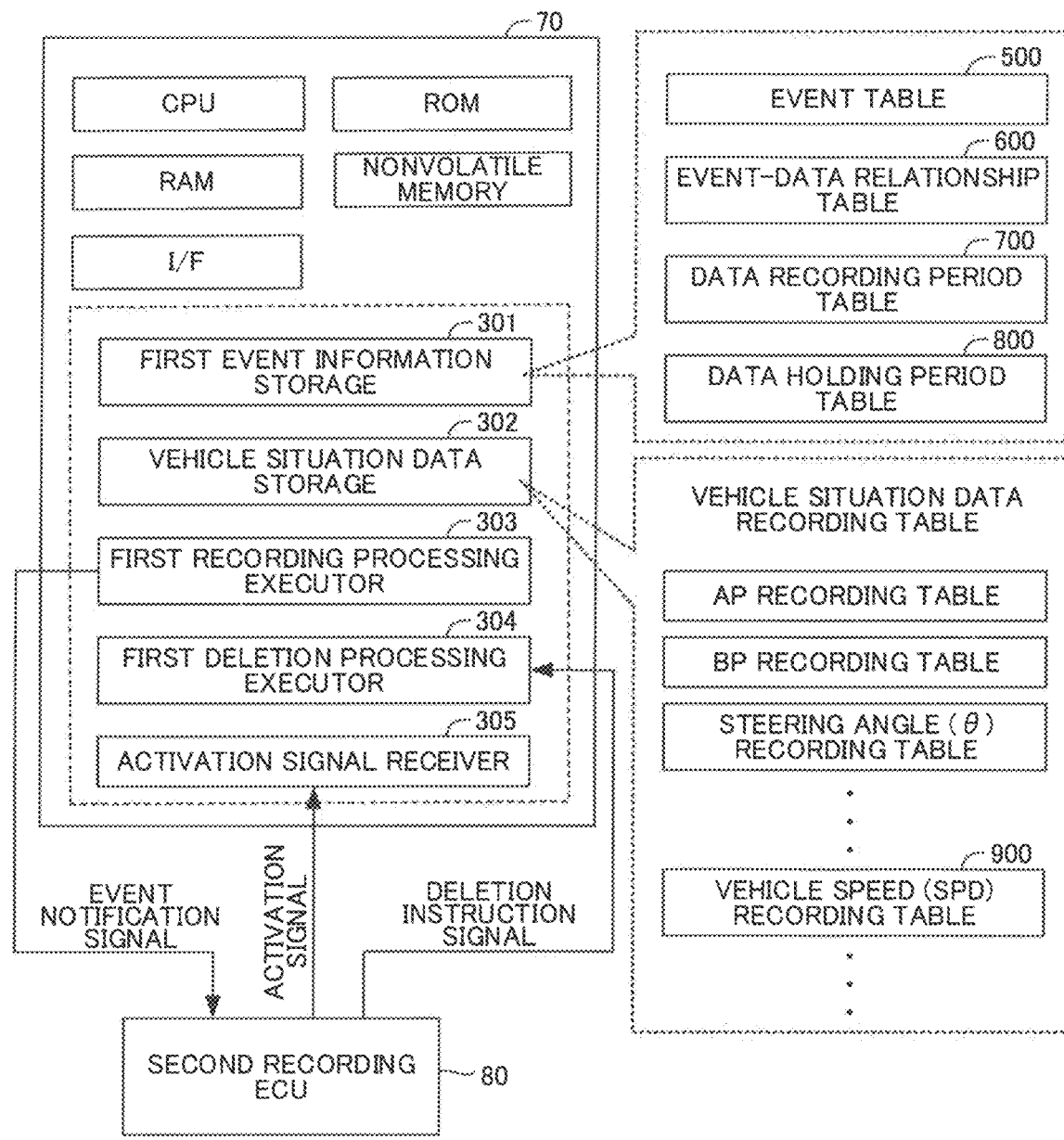
FIG. 3 is a diagram for illustrating a configuration of a first recording ECU.

The first recording ECU 70 is configured to execute "processing of recording the vehicle situation data and processing of deleting the vehicle situation data" described later. Therefore, as illustrated in FIG. 3, the first recording ECU 70 includes a first event information storage 301, a vehicle situation data storage 302, a first recording processing executor 303, a first deletion processing executor 304, and an activation signal receiver 305 as functional components.

The first recording ECU 70 operates in an operation mode, which is any one of a normal mode and a sleep mode. The first recording ECU 70 is configured to be able to detect the state of the IG switch 120. When the state of the IG switch 120 is the ON state (that is, the state of the start button 110 is the ON state), the first recording ECU 70 operates in the normal mode. The normal mode is a mode in which the components 301 to 304 can operate, and is a mode in which "the processing of recording the vehicle situation data and the processing of deleting the vehicle situation data" can be executed.

On the contrary, when the state of the IG switch 120 is the OFF state (that is, when the state of the start button 110 is the OFF state), the first recording ECU 70 operates in the sleep mode. The sleep mode is a mode in which only the minimum component (activation signal receiver 305) can operate, and is a mode in which "the processing of recording the vehicle situation data and the processing of deleting the vehicle situation data" cannot be executed. The sleep mode is a mode that has a lower power consumption amount than that of the normal mode, and is sometimes referred to as "power saving mode". When the activation signal receiver 305 receives an activation signal described later from the second recording ECU 80 under a situation in which the first recording ECU 70 is operating in the sleep mode, the first recording ECU 70 changes the operation mode from the sleep mode to the normal mode.

The first event information storage 301 is a part of the nonvolatile memory of the first recording ECU 70. The first event information storage 301 stores an event table 500 shown in FIG. 5, an event-data relationship table 600 shown in FIG. 6, a data recording period table 700 shown in FIG. 7, and a data holding period table 800 shown in FIG. 8.

The event table 500 includes information on events for which the vehicle situation data is to be recorded. The event table 500 includes an event ID 501 and an event detail 502 as component items. The event ID 501 is identification information for specifying/identifying an event (a type of an event). The event detail 502 is details of an event for which the vehicle situation data is to be recorded. The event includes the situation of the vehicle, the situation of the driver, and the situation of the periphery of the vehicle as described later, and is not particularly limited. In this example, the event is an event relating to the start/end of the travel supporting control (ACC and PCS). For example, in the example shown in FIG. 5, when the event ID is "1", the event detail 502 is "end of ACC". When the event ID is "2", the event detail 502 is "start of PCS".

The event-data relationship table 600 includes information on a correspondence between an event and vehicle situation data to be recorded when the event has occurred. The event-data relationship table 600 includes vehicle situation data 601 and an event ID 602 as component items. In this table 600, the event ID is associated with the vehicle situation data. In such a manner, the vehicle situation data to be recorded is defined in advance in accordance with the type (event ID) of an event. For example, when the event ID is "1" (when the ACC is finished), "the vehicle speed SPD, the acceleration Gs, and the position information (the position of the vehicle acquired from the GPS receiver 98)" among pieces of vehicle situation data are recorded.

The data recording period table 700 includes information on a period in which the vehicle situation data is to be recorded. The data recording period table 700 includes an event ID 701, a recording start time point 702, and a recording end time point 703 as component items. The recording start time point 702 is information on a time point at which recording of the vehicle situation data is to be started. The recording end time point 703 is information on a time point at which recording of the vehicle situation data is to be finished. A period defined by the recording start time point 702 and the recording end time point 703 is longer than the above-mentioned first predetermined period of time. In such a manner, the period in which the vehicle situation data is to be recorded is defined in accordance with the type (event ID) of an event. For example, when the event ID is "1", the vehicle situation data is recorded in a period from "t1 seconds before an end time point of the ACC" to "t2 seconds after the end time point of the ACC".

The data holding period table 800 includes information on a period in which the vehicle situation data is to be held/maintained. The data holding period table 800 includes an event ID 801 and a data holding period 802 as component items. The data holding period 802 is a period in which the vehicle situation data is to be held. The data holding period 802 indicates a period in which the vehicle situation data is to be held since a time point (a timestamp 902 described later) at which the vehicle situation data was acquired. The data holding period 802 is defined in accordance with the type (event ID) of an event. For example, when the event ID is 1, the data holding period is "Ta1". Thus, the vehicle situation data corresponding to the event ID of "1" is held without being deleted in at least a period of "Ta1" in the vehicle situation data storage 302.

The vehicle situation data storage 302 is a part of the nonvolatile memory of the first recording ECU 70, and stores the vehicle situation data. The vehicle situation data storage 302 stores a plurality of tables (vehicle situation data recording tables) corresponding to respective pieces of vehicle situation data. For example, as shown in FIG. 9, the vehicle situation data storage 302 includes a vehicle speed (SPD) recording table 900. The vehicle speed (SPD) recording table 900 includes an event ID 901, the timestamp 902, and a vehicle speed (SPD) 903 as component items. The timestamp 902 is a time point (including a date) at which the vehicle speed SPD was acquired (detected). Other vehicle situation data is also recorded in tables having the same data structure as that of FIG. 9. That is, the vehicle situation data is recorded in association with the event ID and the time point (timestamp) at which the vehicle situation data was acquired.

The first recording processing executor 303 refers to the event table 500 to determine whether or not an event defined in advance in the event detail 502 has occurred. When the first recording processing executor 303 determines that an event has occurred, the first recording processing executor 303 executes the processing of recording the vehicle situation data. Specifically, the first recording processing executor 303 refers to the event-data relationship table 600 to record, in the vehicle situation data storage 302, the vehicle situation data corresponding to the event (the event ID in actuality) that has occurred. In this case, the first recording processing executor 303 refers to the data recording period table 700 to record, in the vehicle situation data storage 302, the vehicle situation data corresponding to the period (the period defined by the recording start time point 702 and the recording end time point 703) defined in the data recording period table 700.

The first recording ECU 70 is configured to temporarily store the vehicle situation data in association with the time point at which the vehicle situation data was acquired in the RAM over a period corresponding to the longest period out of the periods defined in the data recording period table 700. The first recording ECU 70 acquires "the vehicle situation data and the time point at which the vehicle situation data was acquired" from the information acquisition apparatus 90 each time the first predetermined period of time elapses. Thus, the vehicle situation data stored in the RAM is updated to the newest data each time the first predetermined period of time elapses (that is, the oldest data is deleted from the RAM, and the newest data is stored in the RAM).

Further, the first recording processing executor 303 transmits a predetermined event notification signal to the second recording ECU 80. The event notification signal includes information that enables identification of the event ID and the time point (including a date; this time point is hereinafter referred to as "event occurrence time point") at which the event occurred.

When the first deletion processing executor 304 receives a deletion instruction signal described later from the second recording ECU 80, the first deletion processing executor 304 determines whether the state of the IG switch 120 is the ON state or the OFF state. When the state of the IG switch 120 is the OFF state at the time point at which the first deletion processing executor 304 receives the deletion instruction signal from the second recording ECU 80, the first deletion processing executor 304 executes the processing of deleting the vehicle situation data. Specifically, the first deletion processing executor 304 refers to the data holding period table 800. Then, in each of the plurality of vehicle situation data recording tables stored in the vehicle situation data storage 302, the first deletion processing executor 304 deletes vehicle situation data for which the period that has elapsed since the timestamp 902 exceeds the data holding period 802.

For example, it is assumed that a deletion trigger condition 1102 corresponding to the event ID of "1" is satisfied. In this case, when the first deletion processing executor 304 receives the deletion instruction signal from the second recording ECU 80, the first deletion processing executor 304 acquires the data holding period Ta1 corresponding to the event ID of "1" from the data holding period table 800. The first deletion processing executor 304 deletes vehicle situation data for which the event ID 901 is "1" and the period that has elapsed since the timestamp 902 exceeds the data holding period Ta1, in each of the plurality of vehicle situation data recording tables. In such a manner, the first deletion processing executor 304 deletes a piece of vehicle situation data for which the period that has elapsed since the timestamp 902 exceeds the data holding period Ta1, among pieces of vehicle situation data associated with the event ID (="1") corresponding to the satisfied deletion trigger condition 1102.

Further, in this example, the first deletion processing executor 304 can also delete vehicle situation data associated with events other than the event of the event ID (="1") corresponding to the satisfied deletion trigger condition 1102. That is, the first deletion processing executor 304 refers to all of the records of the data holding period table 800 to acquire the data holding period 802 corresponding to each of the event IDs of n (n=1, 2, . . . ). Then, the first deletion processing executor 304 deletes vehicle situation data for which the period that has elapsed since the timestamp 902 exceeds the data holding period 802 for each event ID, in each of the plurality of vehicle situation data recording tables. In such a manner, when the deletion trigger condition 1102 is satisfied (that is, when the deletion instruction signal is received from the second recording ECU 80), the first deletion processing executor 304 deletes all of the pieces of vehicle situation data to be deleted at this time point.

When the state of the IG switch 120 is the ON state at the time point at which the first deletion processing executor 304 receives the deletion instruction signal from the second recording ECU 80, the first deletion processing executor 304 determines whether or not a predetermined deletion processing execution condition described below is satisfied. The deletion processing execution condition is a condition satisfied when a probability (likelihood) that the first recording processing executor 303 is executing the processing of recording the vehicle situation data is low in a period in which the state of the IG switch 120 is the ON state. When the processing of deleting the vehicle situation data is executed under the situation in which the first recording processing executor 303 is executing the processing of recording the vehicle situation data, there is a problem in that a processing load applied to the first recording ECU 70 becomes higher. Therefore, the first deletion processing executor 304 is configured to execute the processing of deleting the vehicle situation data when the deletion processing execution condition is satisfied, and not to execute the processing of deleting the vehicle situation data when the deletion processing execution condition is not satisfied.

When the activation signal receiver 305 receives the activation signal described later from the second recording ECU 80 under the situation in which the operation mode of the first recording ECU 70 is the sleep mode, the activation signal receiver 305 changes the operation mode from the sleep mode to the normal mode.

(Configuration of Second Recording ECU)

Figure 4:
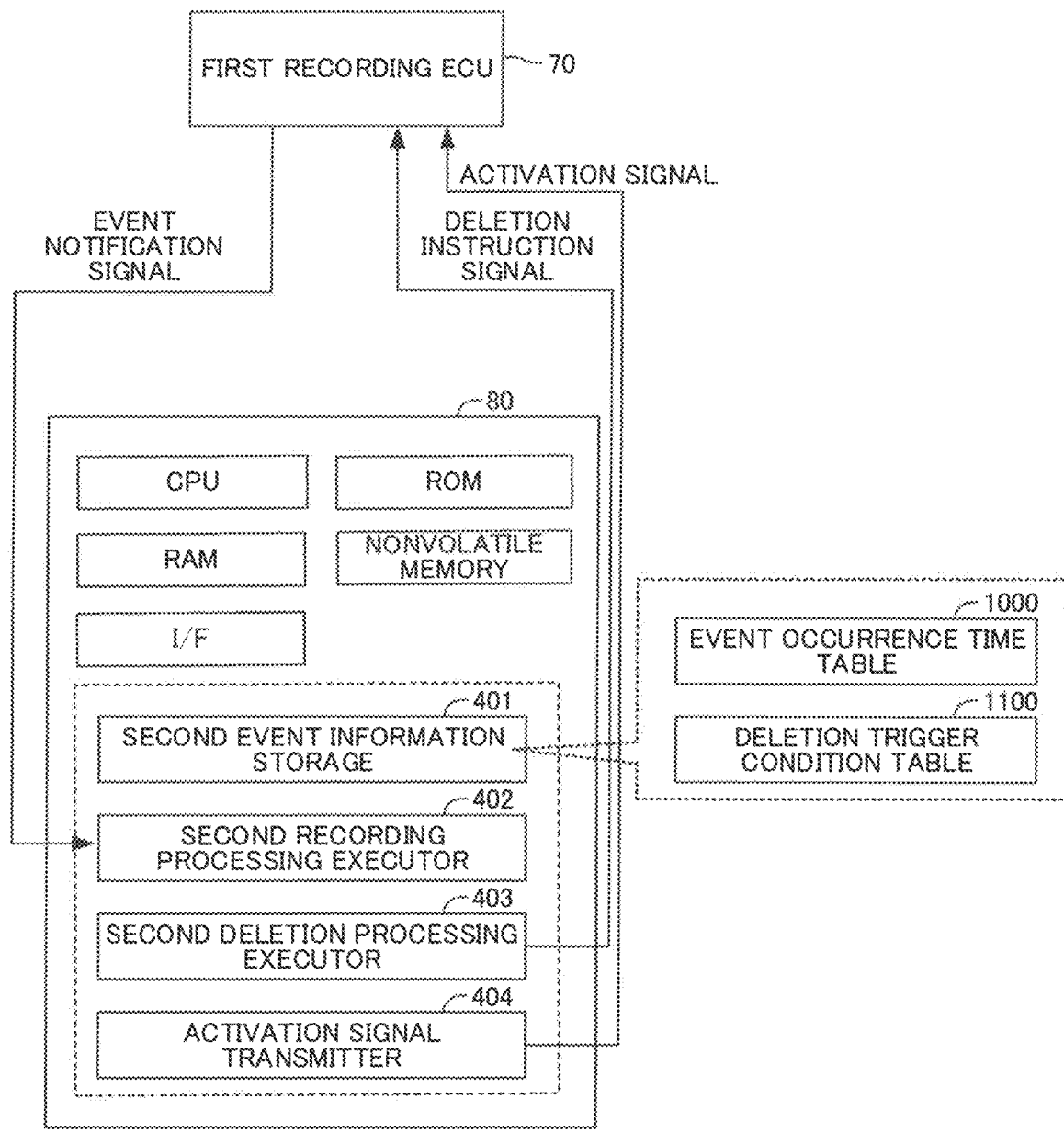
FIG. 4 is a diagram for illustrating a configuration of a second recording ECU.

The second recording ECU 80 is configured to notify the first recording ECU 70 of arrival of a timing at which the "processing of deleting the vehicle situation data" is to be executed. Therefore, as illustrated in FIG. 4, the second recording ECU 80 includes a second event information storage 401, a second recording processing executor 402, a second deletion processing executor 403, and an activation signal transmitter 404 as functional components. The second recording ECU 80 is configured to be able to detect the state of the IG switch 120.

The second event information storage 401 stores an event occurrence time table 1000 shown in FIG. 10 and a deletion trigger condition table 1100 shown in FIG. 11.

The event occurrence time table 1000 includes information on an event occurrence time point. The event occurrence time table 1000 includes an event ID 1001 and an event occurrence time point (including a date) 1002 as component items.

The deletion trigger condition table 1100 includes information on the deletion trigger conditions. The deletion trigger condition is a condition satisfied when a timing (specifically, a timing to transmit the deletion instruction signal described later to the first recording ECU 70) to delete the vehicle situation data has arrived. The deletion trigger condition is defined in accordance with the type (event ID) of an event. The deletion trigger condition table 1100 includes an event ID 1101 and a deletion trigger condition 1102 as component items.

In this example, the deletion trigger condition 1102 is a condition defined with the event occurrence time point 1002 serving as a reference. Regarding an event ID of n (n=1, 2, . . . ), the deletion trigger condition is satisfied when a period that has elapsed since the event occurrence time point 1002 becomes longer than a threshold value Tbn. The threshold value Tbn is longer than a data holding period Tan (see FIG. 8) for the event ID of n. For example, in a case in which the event ID is "1", the deletion trigger condition is satisfied when the period that has elapsed since the event occurrence time point 1002 becomes longer than the threshold value Tb1. The threshold value Tb1 is a value larger than the data holding period Ta1 corresponding to "event ID=1". In such a manner, the threshold value Tbn is set to be larger than the data holding period Tan, and when the deletion trigger condition 1102 is satisfied, the vehicle situation data corresponding to the satisfied deletion trigger condition is thus deleted from the vehicle situation data storage 302.

When the second recording processing executor 402 receives the event notification signal from the first recording ECU 70, the second recording processing executor 402 records the event ID and the event occurrence time point included in the event notification signal in the event occurrence time table 1000.

The second deletion processing executor 403 is configured to determine whether or not an event for which the deletion trigger condition 1102 defined in the deletion trigger condition table 1100 is satisfied exists in the events (the event IDs in actuality) recorded in the event occurrence time table 1000. The event for which the deletion trigger condition 1102 is satisfied is hereinafter referred to as "target event". When a target event exists in the event occurrence time table 1000, the second deletion processing executor 403 transmits the deletion instruction signal to the first recording ECU 70. The deletion instruction signal is a signal for instructing the first recording ECU 70 to execute the "processing of deleting the vehicle situation data".

The activation signal transmitter 404 is configured to transmit an activation signal to the first recording ECU 70 when the state of the IG switch 120 is the OFF state. The activation signal is a signal for instructing the first recording ECU 70 to change the operation mode from the sleep mode to the normal mode. This activation signal is sometimes referred to as "wakeup signal".

(Operation)

Figure 12:
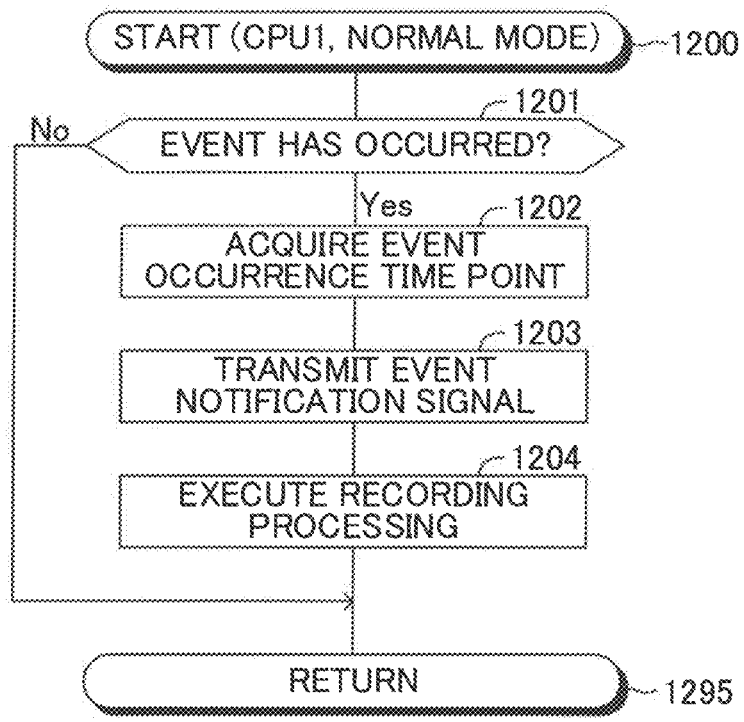
FIG. 12 is a flowchart for illustrating a "vehicle situation data recording routine" to be executed by a CPU of the first recording ECU.

The CPU (hereinafter referred to as "CPU1") of the first recording ECU 70 is configured to execute a routine illustrated in FIG. 12 each time a "second predetermined time equal to or longer than the first predetermined period of time" elapses under a situation in which the operation mode is the normal mode.

The CPU1 acquires "the vehicle situation data and the time point at which the vehicle situation data was acquired" from the information acquisition apparatus 90 each time the first predetermined period of time elapses. Then, the first CPU1 stores, in the RAM, "the vehicle situation data and the time point at which the vehicle situation data was acquired" for a period corresponding to the longest period out of the periods defined in the data recording period table 700.

The CPU1 starts the processing from Step 1200, and proceeds to Step 1201 to determine whether or not an event defined in the event detail 502 of the event table 500 has occurred. When the event has not occurred, the CPU1 makes a determination of "No" in Step 1201, and directly proceeds to Step 1295 to temporarily finish this routine.

On the contrary, when the event has occurred, the CPU1 makes a determination of "Yes" in Step 1201, and successively executes processing from Step 1202 to Step 1204 described below. Then, the CPU1 proceeds to Step 1295 to temporarily finish this routine.

Step 1202: The CPU1 uses a timer (not shown) to acquire a time point (including a date) at a current time point as an event occurrence time point.

Step 1203: The CPU1 transmits the event notification signal (including the event ID and the event occurrence time point) to the second recording ECU 80.

Step 1204: the CPU1 waits until the "recording end time point 703 of the data recording period table 700" corresponding to the event (event ID) arrives. Then, the CPU1 executes the processing of recording the vehicle situation data. Specifically, the CPU1 refers to the event-data relationship table 600 to record the vehicle situation data corresponding to the event (event ID) that has occurred in the nonvolatile memory (vehicle situation data storage 302). In this case, the CPU1 refers to the data recording period table 700 to acquire, from the RAM, the vehicle situation data corresponding to the period defined by the recording start time point 702 and the recording end time point 703. Then, the CPU1 records the acquired vehicle situation data associated with "the time at which the vehicle situation data was acquired and the event ID" in the vehicle situation data recording table of the vehicle situation data storage 302.

Figure 13:
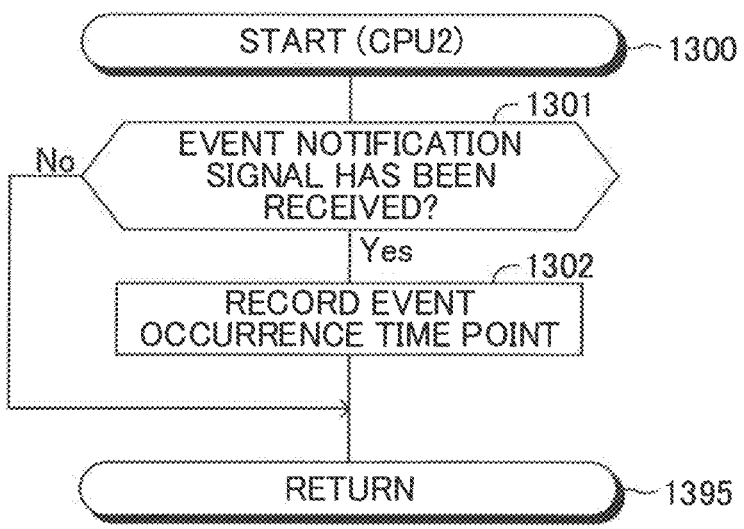
FIG. 13 is a flowchart for illustrating an "event occurrence time recording routine" to be executed by a CPU of the second recording ECU.

A CPU (hereinafter referred to as "CPU2") of the second recording ECU 80 is configured to execute a routine illustrated in FIG. 13 each time the second predetermined time elapses.

The CPU2 starts processing from Step 1300, and proceeds to Step 1301 to determine whether or not the event notification signal has been received. When the event notification signal has not been received, the CPU2 makes a determination of "No" in Step 1301, and directly proceeds to Step 1395 to temporarily finish this routine.

On the contrary, when the event notification signal has been received, the CPU2 makes a determination of "Yes" in Step 1301, and proceeds to Step 1302 to record the event ID and the event occurrence time point included in the event notification signal in the event occurrence time table 1000. Then, the CPU2 proceeds to Step 1395 to temporarily finish this routine.

Figure 14:
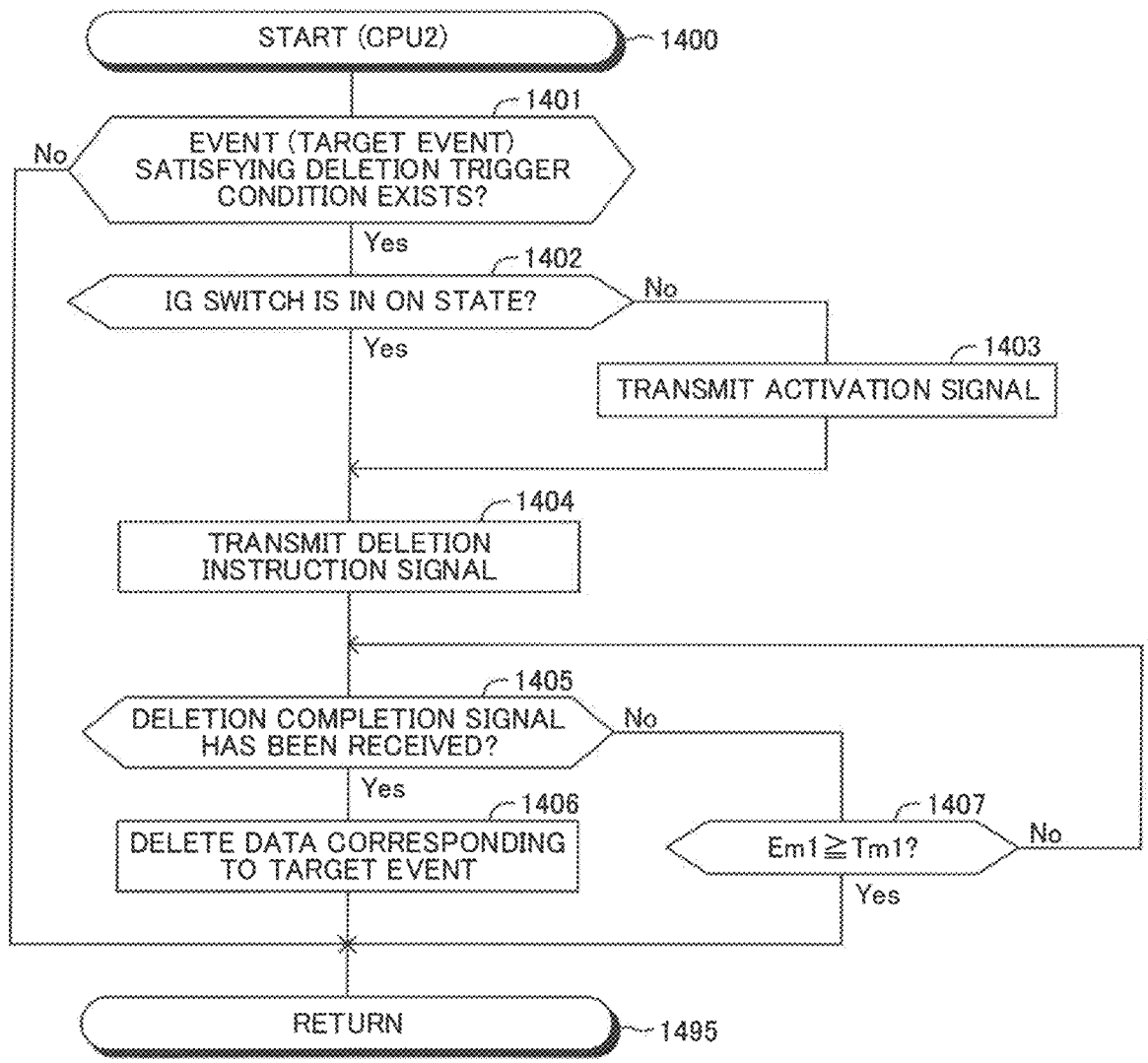
FIG. 14 is a flowchart for illustrating a "deletion processing instruction routine" to be executed by the CPU of the second recording ECU.

Further, the CPU2 is configured to execute a routine illustrated in FIG. 14 each time the second predetermined time elapses.

The CPU2 starts processing from Step 1400, and proceeds to Step 1401 to determine whether or not an event (target event) for which the deletion trigger condition 1102 is satisfied exists in the event occurrence time table 1000. When the target event does not exist, the CPU2 makes a determination of "No" in Step 1401, and directly proceeds to Step 1495 to temporarily finish this routine.

On the contrary, when a target event exists, the CPU2 makes a determination of "Yes" in Step 1401, and proceeds to Step 1402 to determine whether or not the state of the IG switch 120 is the ON state. When the state of the IG switch 120 is the ON state, the CPU2 makes a determination of "Yes" in Step 1402, and proceeds to Step 1404.

On the contrary, when the state of the IG switch 120 is the OFF state, the CPU2 makes a determination of "No" in Step 1402, and proceeds to Step 1403 to transmit the activation signal to the first recording ECU 70. Then, the CPU2 proceeds to Step 1404.

When the CPU2 proceeds to Step 1404, the CPU2 transmits the deletion instruction signal to the first recording ECU 70. Then, the CPU2 proceeds to Step 1405 to determine whether or not a deletion completion signal described later has been received from the first recording ECU 70. When the deletion completion signal has been received, the CPU2 makes a determination of "Yes" in Step 1405, and proceeds to Step 1406 to delete data corresponding to the target event (namely, a record corresponding to the target event) from the event occurrence time table 1000. Then, the CPU2 proceeds to Step 1495 to temporarily finish this routine. In this way, when a target event exists in the data recorded in the event occurrence time table 1000, the CPU2 transmits the deletion instruction signal. When the CPU2 receives the deletion completion signal in response to the deletion instruction signal, the CPU2 deletes data (record) corresponding to the target event from the event occurrence time table 1000.

On the contrary, when the CPU2 does not receive the deletion completion signal, the CPU2 makes a determination of "No" in Step 1405, and proceeds to Step 1407 to determine whether or not a "period Em1 that has elapsed since a time point at which the deletion instruction signal was transmitted in Step 1404" is equal to or longer than a predetermined threshold value Tm1. The threshold value Tm1 is a value sufficiently longer than a period required by the first recording ECU 70 to complete processing (processing in Step 1604 of a routine of FIG. 16 described later) of deleting the vehicle situation data. When the elapsed period Em1 is shorter than the threshold value Tm1, the CPU2 makes a determination of "No" in Step 1407, and returns to Step 1405.

When the elapsed period Em1 is equal to or longer than the threshold value Tm1, the CPU2 makes a determination of "Yes" in Step 1407, and proceeds to Step 1495 to temporarily finish this routine. This means that a determination of "No" has been made in Step 1603 of FIG. 16 described later, and thus the first recording ECU 70 has not executed the processing (processing in Step 1604 of the routine of FIG. 16) of deleting the vehicle situation data. Thus, data corresponding to the target event (namely, a record corresponding to the target event) is not deleted from the event occurrence time table 1000.

Figure 15:
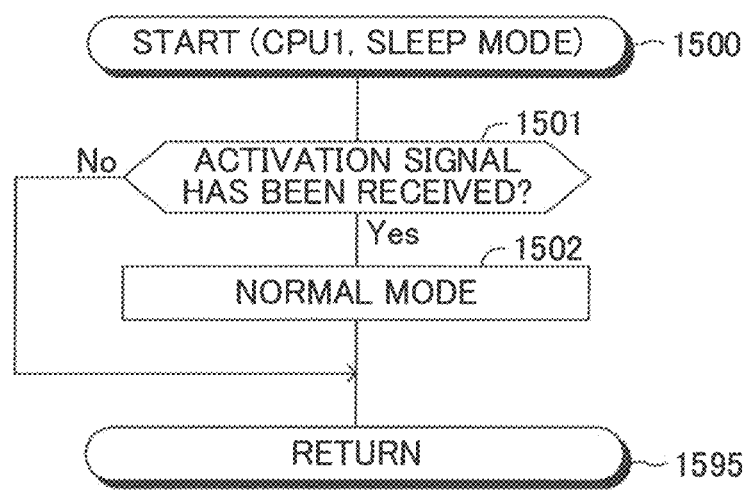
FIG. 15 is a flowchart for illustrating a "mode change routine" to be executed by the CPU of the first recording ECU.

Further, the CPU1 is configured to execute a routine illustrated in FIG. 15 each time the second predetermined time elapses under the situation in which the operation mode is the sleep mode.

The CPU1 starts processing from Step 1500, and proceeds to Step 1501 to determine whether or not the activation signal has been received. When the activation signal has not been received, the CPU1 makes a determination of "No" in Step 1501, and directly proceeds to Step 1595 to temporarily finish this routine.

On the contrary, when the activation signal has been received, the CPU1 makes a determination of "Yes" in Step 1501, and proceeds to Step 1502 to change the operation mode from the sleep mode to the normal mode. Then, the CPU1 proceeds to Step 1595 to temporarily finish this routine.

Figure 16:
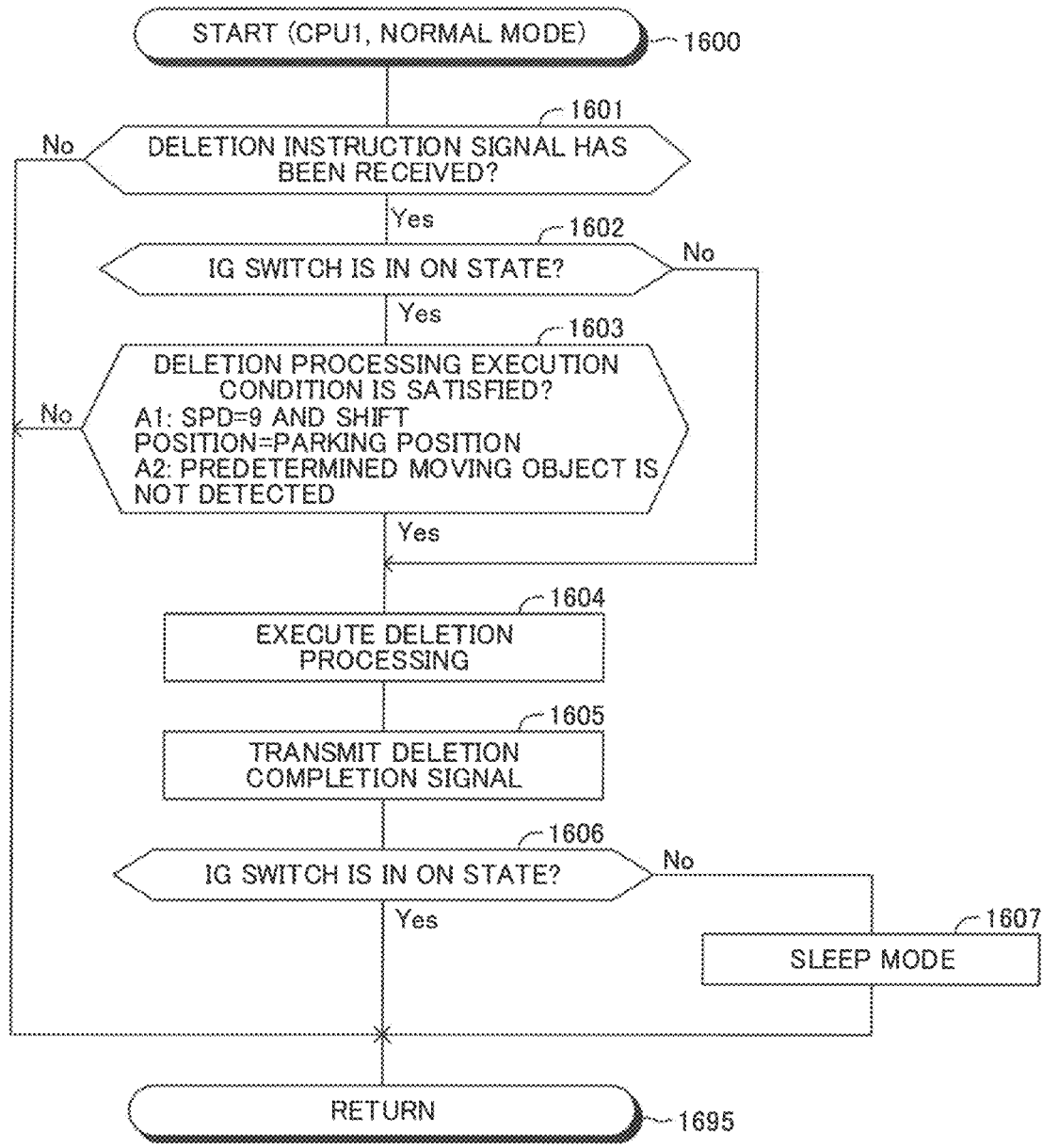
FIG. 16 is a flowchart for illustrating a "vehicle situation data deletion routine" to be executed by the CPU of the first recording ECU.

Further, the CPU1 is configured to execute a routine illustrated in FIG. 16 each time the second predetermined time elapses under the situation in which the operation mode is the normal mode.

The CPU1 starts processing from Step 1600, and proceeds to Step 1601 to determine whether or not the deletion instruction signal has been received. When the deletion instruction signal has not been received, the CPU1 makes a determination of "No" in Step 1601, and directly proceeds to Step 1695 to temporarily finish this routine.

On the contrary, when the deletion instruction signal is received, the CPU1 makes a determination of "Yes" in Step 1601, and proceeds to Step 1602 to determine whether or not the state of the IG switch 120 is the ON state. It is assumed that the state of the IG switch 120 is currently the ON state. In this case, the CPU1 makes a determination of "Yes" in Step 1602, and proceeds to Step 1603 to determine whether or not a predetermined deletion processing execution condition is satisfied.

Under a situation in which the vehicle is stopped, and a predetermined object does not exist in a periphery of the vehicle, a possibility that an "event for which the vehicle situation data is to be recorded (namely, an event corresponding to the event detail 502)" occurs is low. Thus, a probability that the CPU1 is executing the recording processing is low in this situation. Thus, the deletion processing execution condition includes a condition A1 (vehicle stopping condition) satisfied when the vehicle is stopped and a condition A2 (vehicle periphery condition) satisfied when the predetermined object does not exist in the periphery of the vehicle. The deletion processing execution condition is satisfied when both of the condition A1 and the condition A2 are satisfied.

(Condition A1) The vehicle speed SPD is 0, and the shift position is the parking position.

(Condition A2) A predetermined moving object (another vehicle, a two-wheeled vehicle, a pedestrian, or the like) is not detected within a predetermined distance range from the vehicle.

When the deletion processing execution condition is not satisfied, the CPU1 makes the determination of "No" in Step 1603, and directly proceeds to Step 1695 to temporarily finish this routine. Thus, the processing of deleting the vehicle situation data is not executed.

On the contrary, when the deletion processing execution condition is satisfied, the CPU1 makes a determination of "Yes" in Step 1603, and successively executes processing from Step 1604 to Step 1605 described below. Then, the CPU1 proceeds to Step 1606.

Step 1604: The CPU1 executes the processing of deleting the vehicle situation data. Specifically, the CPU1 refers to all of the records of the data holding period table 800 to acquire the data holding period 802 corresponding to each of the event IDs of n (n=1, 2, . . . ). Then, in each of the plurality of vehicle situation data recording tables, the CPU1 deletes vehicle situation data for which the period that has elapsed since the timestamp 902 exceeds the data holding period 802 for each event ID.

It is assumed that, for example, the deletion trigger condition 1102 corresponding to the event ID of "1" is satisfied, and the CPU1 receives the deletion instruction signal (Yes in Step 1601). In this case, the CPU1 deletes at least a piece of vehicle situation data for which the period that has elapsed since the timestamp 902 exceeds the data holding period 802 (=Ta1), among pieces of vehicle situation data associated with the event ID (="1") corresponding to the satisfied deletion trigger condition 1102. In this case, there may also be a piece of data for which the period that has elapsed since the timestamp 902 exceeds the data holding period 802, among pieces of vehicle situation data associated with an event ID other than the event ID of "1". In this example, the CPU1 also deletes a piece of data for which the period that has elapsed the timestamp 902 exceeds the data holding period 802, among pieces of vehicle situation data associated with an event ID other than the event ID (="1") corresponding to the satisfied deletion trigger condition 1102.

Step 1605: The CPU1 transmits the deletion completion signal to the second recording ECU 80. The deletion completion signal is a signal for notifying of the completion of the processing of deleting the vehicle situation data.

When the CPU1 proceeds to Step 1606, the CPU1 determines whether or not the state of the IG switch 120 is the ON state. The state of the IG switch 120 is currently the ON state. Thus, the CPU1 makes a determination of "Yes" in Step 1606, and proceeds to Step 1695 to temporarily finish this routine.

When the state of the IG switch 120 is the OFF state at the time point at which the CPU1 proceeds to Step 1602, the CPU1 makes a determination of "No" in Step 1602, and directly proceeds to Step 1604. The CPU1 successively executes the processing in Step 1604 to Step 1605 as described before, and then makes a determination of "No" in Step 1606 to proceed to Step 1607.

The CPU1 changes the operation mode from the normal mode to the sleep mode in Step 1607, proceeds to Step 1695, and temporarily finishes this routine.

As described above, when the deletion trigger condition 1102 is satisfied, the recording apparatus executes the processing of deleting the vehicle situation data. The deletion trigger condition 1102 is a condition satisfied when an appropriate timing to delete the vehicle situation data stored in the vehicle situation data storage 302 is reached, and is defined in accordance with the type of an event. With this configuration, the vehicle situation data is deleted at the appropriate timing defined for each type of the event, and thus it is possible to avoid a state in which unnecessary vehicle situation data (for example, old vehicle situation data) continues to remain in the vehicle situation data storage 302. Further, it is also possible to prevent a state in which a remaining capacity of the vehicle situation data storage 302 becomes insufficient because the unnecessary vehicle situation data is not deleted.

Further, the deletion trigger condition 1102 is the condition defined with the event occurrence time point serving as a reference. The recording apparatus can execute the processing of deleting the vehicle situation data in accordance with the period that has elapsed since the event occurrence time point.

When the first recording ECU 70 executes the processing of deleting the vehicle situation data simultaneously with the processing of recording the vehicle situation data, there is a problem in that the processing load on the first recording ECU 70 increases. In contrast, when the state of the IG switch 120 is the OFF state, the first recording ECU 70 is not executing the processing of recording the vehicle situation data. Thus, the recording apparatus executes the processing of deleting the vehicle situation data when the condition that the state of the IG switch 120 is the OFF state is satisfied (No in Step 1602) in addition to the deletion trigger condition 1102 (Yes in Step 1401). The deletion processing is executed in the period in which the recording processing is not being executed, and thus the processing load on the first recording ECU 70 can be reduced.

On the contrary, when the state of the IG switch 120 is the ON state, the vehicle is being driven, and thus the processing of recording the vehicle situation data may be in execution. Thus, the recording apparatus executes the processing of deleting the vehicle situation data when the condition that the state of the IG switch 120 is the ON state is satisfied (Yes in Step 1602) and the deletion processing execution condition is satisfied (Yes in Step 1603) in addition to the deletion trigger condition 1120 (Yes in Step 1401). The deletion processing execution condition is the condition satisfied when the probability that the first recording ECU 70 is executing the processing of recording the vehicle situation data is low. Therefore, it is possible to increase a possibility that the deletion processing is to be executed during the period in which the recording processing is not being executed.

According to the recording apparatus, when the state of the IG switch 120 is the OFF state, the first recording ECU 70 operates in the sleep mode. Thus, power consumption of the first recording ECU 70 can be reduced. Meanwhile, the first recording ECU 70 cannot execute the processing of deleting the vehicle situation data under the situation in which the first recording ECU 70 is operating in the sleep mode. Even in this situation, the second recording ECU 80 transmits the activation signal to the first recording ECU 70, and thus the operation mode of the first recording ECU 70 is changed from the sleep mode to the normal mode. As a result, the first recording ECU 70 can execute the processing of deleting the vehicle situation data even under the situation in which the state of the IG switch 120 is the OFF state.

The present disclosure is not limited to at least one embodiment described above, and various modification examples can be adopted within the scope of the present disclosure.

Modification Example 1

The event detail 502 defined in the event table 500 is not limited to the above-mentioned examples. The event detail 502 may be defined based on one, or a combination of two or more of, the following items (B1) to (B8).

(B1) Information on the travel situation of the vehicle (for example, the vehicle speed SPD and the acceleration Gs).

(B2) Information on the driving situation of the vehicle (for example, the accelerator pedal operation amount AP, the brake pedal operation amount BP, the actual steering angle θ, the actual steering torque Tra, the number of revolutions of an engine, a fuel injection amount in the engine 12, a hydraulic pressure in a master cylinder, and various control command values). The control command value includes, for example, an engine control command value transmitted by the engine ECU 10 to the engine actuator 11 and a brake control command value transmitted by the brake ECU 20 to the hydraulic circuit 21.

(B3) Information on a relationship between the vehicle and an object existing in the periphery of the vehicle (for example, a distance between the vehicle and a right end (or a left end) of a travel lane, and a distance between the vehicle and a 3D object).

(B4) Information on an environment in a vehicle cabin (for example, the temperature and the humidity in the vehicle cabin).

(B5) Information on an environment of the periphery of the vehicle (for example, the temperature and the humidity outside the vehicle cabin).

(B6) Information on a state of the driver (for example, information on a direction of the line of sight of the driver and information on a body condition of the driver (e.g., the heart rate, the blood pressure, and the body temperature)).

(B7) Information on whether or not travel supporting control is being executed, and information on a start and an end of the travel supporting control. The travel supporting control includes an anti-lock brake system (ABS), traction control (TRC), vehicle stability control (VSC), and lane keeping assist (LKA) in addition to the above-mentioned ACC and PCS.

(B8) Information on a situation of the power supply apparatus 100 (for example, a voltage value of the battery).

For example, the event detail 502 may be "the vehicle speed SPD has become equal to or higher than a predetermined speed threshold value SPth during the execution of the ACC". In this case, the recording start time point 702 may be a "time point at which the vehicle speed SPD has become equal to or higher than the predetermined speed threshold value SPth during the execution of the ACC", and the recording end time point 703 may be a "time point at which a predetermined period of time has elapsed since the record start time point 702".

Further, the event detail 502 may be defined in accordance with information on a type of the vehicle (information on whether the vehicle is a gasoline vehicle, a hybrid vehicle, or an electric vehicle).

Modification Example 2

The vehicle situation data recorded in the vehicle situation data storage 302 is not limited to the above-mentioned example. Some of the information described in the above-mentioned items (B1) to (B8) may be recorded in the vehicle situation data storage 302 as the vehicle situation data.

Modification Example 3

The deletion trigger condition 1102 is not limited to the above-mentioned example. The deletion trigger condition 1102 may be any one of the following condition (C1) to condition (C3).

(C1) The travel distance of the vehicle from the event occurrence time point 1002 has become equal to or longer than a predetermined travel distance threshold value. The travel distance threshold value may be defined in accordance with the type (event ID) of an event.

(C2) The number of times of occurrence of an event has become equal to or larger than a predetermined occurrence count threshold value. The occurrence count threshold value may be defined in accordance with the type (event ID) of an event.

(C3) The number of times of operations of the IG switch 120 from the event occurrence time point 1002 has become equal to or larger than a predetermined operation count threshold value. The operation count threshold value may be defined in accordance with the type (event ID) of an event. The number of times of operations includes at least one of the number of times of changes from the ON state to the OFF state of the IG switch 120 and the number of times of changes from the OFF state to the ON state of the IG switch 120.

Modification Example 4

The deletion instruction signal in Step 1404 of the routine of FIG. 14 may include information on the event ID corresponding to the satisfied deletion trigger condition 1102. In this case, in the deletion processing in Step 1604 of FIG. 16, the first recording ECU 70 may delete only the vehicle situation data associated with the event ID included in the deletion instruction signal.

Modification Example 5

The vehicle may include other ECUs (for example, a time-count ECU) (not shown) to be supplied with electric power from the power supply apparatus 100 irrespective of whether the state of the IG switch 120 is the ON state or the OFF state. The functions of the components 401 to 404 of the second recording ECU 80 illustrated in FIG. 4 may be implemented on an ECU (for example, the above-mentioned time-count ECU) having other functions.

Modification Example 6

The functions of the components 401 to 403 of the second recording ECU 80 illustrated in FIG. 4 may be implemented on the first recording ECU 70. In this case, the second recording ECU 80 is omitted. In this configuration, the first recording ECU 70 is configured to operate only in the normal mode.

Modification Example 7

The first recording ECU 70 and the second recording ECU 80 may be implemented on one ECU. For example, the first recording ECU 70 may include a plurality of microcomputers (for example, a main microcomputer and a sub microcomputer). In this configuration, the components of the first recording ECU 70 illustrated in FIG. 3 may be implemented on the main microcomputer, and the components of the second recording ECU 80 illustrated n FIG. 4 may be implemented on the sub microcomputer. In this configuration, the main microcomputer may be configured to operate in any one of the normal mode and the sleep mode.

Modification Example 8

The deletion processing execution condition in Step 1603 is not limited to the above-mentioned example. The deletion processing execution condition may be satisfied when any one of the condition A1 and the condition A2 is satisfied. Further, the condition A1 may be replaced by a condition A1'.

(Condition A1') The vehicle speed SPD is 0.

Modification Example 9

In FIG. 5 to FIG. 11, the various types of information are represented in the table format for the sake of simplicity of description. However, those pieces of information may not always be expressed in the data structure of the table, and may be expressed in other data structure.

What is claimed is:

1. An in-vehicle recording apparatus, comprising:
   at least one sensor configured to acquire vehicle situation data including at least one of vehicle travel data, which is information on a travel situation of a vehicle, or vehicle periphery data, which is information on a situation of a periphery of the vehicle;
   a memory, which enables writing, reading, and deletion of data; and
   an electronic control unit configured to execute, when an event defined in advance for the vehicle has occurred, recording processing of recording the vehicle situation data, which is defined in advance in accordance with a type of the event that has occurred, in the memory,
   wherein the electronic control unit is further configured to, when a deletion condition including a deletion trigger condition is satisfied, executes deletion processing of deleting at least the vehicle situation data corresponding to the satisfied deletion trigger condition from the memory, the deletion trigger condition being defined in advance in accordance with the type of the event and being satisfied when a timing to delete the vehicle situation data stored in the memory arrives,
   wherein the electronic control unit is configured to detect a connection state of a switch, which is configured to be changed from an OFF state to an ON state when a driver of the vehicle starts driving of the vehicle, and be changed from the ON state to the OFF state when the driver of the vehicle finishes the driving of the vehicle, and
   wherein the electronic control unit is configured to execute the deletion processing by determining that the deletion condition is satisfied when, in addition to the deletion trigger condition, a second switch condition and a predetermined deletion processing execution condition are satisfied, the second switch condition being satisfied when the connection state of the switch is the ON state, and the predetermined deletion processing execution condition being satisfied when a probability that the electronic control unit is executing the recording processing is low.

2. The in-vehicle recording apparatus according to claim 1, wherein the electronic control unit is configured to determine that the deletion processing execution condition is satisfied when both of a vehicle stopping condition and a vehicle periphery condition are satisfied, the vehicle stopping condition being satisfied when the vehicle is stopped, and the vehicle periphery condition being satisfied when a predetermined object does not exist in the periphery of the vehicle.

3. An in-vehicle recording apparatus comprising:
   at least one sensor configured to acquire vehicle situation data including at least one of vehicle travel data, which is information on a travel situation of a vehicle, or vehicle periphery data, which is information on a situation of a periphery of the vehicle;
   a memory, which enables writing, reading, and deletion of data; and
   an electronic control unit configured to execute, when an event defined in advance for the vehicle has occurred, recording processing of recording the vehicle situation data, which is defined in advance in accordance with a type of the event that has occurred, in the memory,
   wherein the electronic control unit is further configured to, when a deletion condition including a deletion trigger condition is satisfied, executes deletion processing of deleting at least the vehicle situation data corresponding to the satisfied deletion trigger condition from the memory, the deletion trigger condition being defined in advance in accordance with the type of the event and being satisfied when a timing to delete the vehicle situation data stored in the memory arrives,
   wherein the electronic control unit is configured to detect a connection state of a switch, which is configured to be changed from an OFF state to an ON state when a driver of the vehicle starts driving of the vehicle, and be changed from the ON state to the OFF state when the driver of the vehicle finishes the driving of the vehicle, and
   wherein the electronic control unit includes a first recording electronic control unit and a second recording electronic control unit, to each of which electric power is to be supplied from a power supply apparatus mounted on the vehicle regardless of whether the connection state of the switch is the ON state or the OFF state,
   wherein the first recording electronic control unit is configured to:
      operate in a normal mode, which is a mode in which the recording processing and the deletion processing are allowed to be executed, when the connection state of the switch is the ON state;
      operate in a power saving mode, which is a mode in which a consumption amount of the electric power is smaller than a consumption amount of the electric power in the normal mode, and none of the recording processing and the deletion processing is allowed to be executed, when the connection state of the switch is the OFF state; and
      operate in the normal mode when the first recording electronic control unit receives an activation signal, which instructs to change the power saving mode to the normal mode, under a situation in which the first recording electronic control unit is operating in the power saving mode, and
   wherein the second recording electronic control unit is configured to:
      determine whether the deletion trigger condition is satisfied;
      transmit, when the second recording electronic control unit determines that the deletion trigger condition is satisfied, and the connection state of the switch is the OFF state, the activation signal to the first recording electronic control unit, and then transmit a deletion instruction signal, which instructs to execute the deletion processing, to the first recording electronic control unit; and
      transmit, when the second recording electronic control unit determines that the deletion trigger condition is satisfied, and the connection state of the switch is the ON state, the deletion instruction signal to the first recording electronic control unit without transmitting the activation signal to the first recording electronic control unit.

4. The in-vehicle recording apparatus according to claim 3,
wherein the first recording electronic control unit is configured to:
  determine whether the event has occurred; and
  transmit, when the first recording electronic control unit determines that the event has occurred, an event notification signal to the second recording electronic control unit, the event notification signal including information that enables identification of the type of the event that has occurred and an event occurrence time point indicating a time point at which the event has occurred, and
wherein the second recording electronic control unit is configured to:
  record, when the second recording electronic control unit receives the event notification signal, the type of the event that has occurred and the event occurrence time point, which are included in the event notification signal, in association with each other; and
  determine that the deletion trigger condition is satisfied when a period that has elapsed since the event occurrence time point has become longer than a time threshold value defined in advance for each type of the event, to thereby transmit the deletion instruction signal to the first recording electronic control unit.

* * * * *